US009369596B2

(12) United States Patent
Fukuoh et al.

(10) Patent No.: US 9,369,596 B2
(45) Date of Patent: Jun. 14, 2016

(54) IMAGE PROCESSING APPARATUS, SCREEN DISPLAY CONTROL METHOD, AND RECORDING MEDIUM

(71) Applicant: KONICA MINOLTA, INC., Chiyoda-ku, Tokyo (JP)

(72) Inventors: Chohiko Fukuoh, Musashimurayama (JP); Hiroki Tajima, Toyokawa (JP); Kazuaki Tomono, Okazaki (JP); Taiju Inagaki, Toyokawa (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 14/599,034

(22) Filed: Jan. 16, 2015

(65) Prior Publication Data
US 2015/0222767 A1  Aug. 6, 2015

(30) Foreign Application Priority Data
Jan. 31, 2014  (JP) ................. 2014-018016

(51) Int. Cl.
*H04N 1/00* (2006.01)
(52) U.S. Cl.
CPC ....... *H04N 1/00411* (2013.01); *H04N 1/00496* (2013.01); *H04N 1/00506* (2013.01)
(58) Field of Classification Search
CPC .......... H04N 1/00411; H04N 1/00496; H04N 1/00506

USPC ......... 358/1.13, 1.15; 345/173, 156; 715/700, 715/833, 843
See application file for complete search history.

(56) References Cited

U.S. PATENT DOCUMENTS 9,158,428 B2 * 10/2015 Shimizu ................. G06F 3/048
2015/0153927 A1 * 6/2015 Kashibuchi ........... G06F 3/0488
345/173

FOREIGN PATENT DOCUMENTS

JP      2012103602 A     5/2012

* cited by examiner

*Primary Examiner* — Kent Yip
(74) *Attorney, Agent, or Firm* — Holtz, Holtz & Volek PC

(57) ABSTRACT

An image processing apparatus includes: a touch-enabled display that is capable of displaying a first screen and a second screen smaller than the first screen, the second screen showing information, the second screen to be expanded with a user sliding manipulation; a memory that stores reference information determining which information on the second screen is relevant and irrelevant to the first screen; a judgment portion that judges whether or not the information on the second screen is relevant to the first screen on the basis of the reference information stored on the memory; and a display controller that expands the second screen even without the sliding manipulation being completely finished if the information on the second screen is relevant to the first screen and that restores the second screen to the previous state upon finish of the sliding manipulation if the information on the second screen is irrelevant to the first screen.

15 Claims, 7 Drawing Sheets

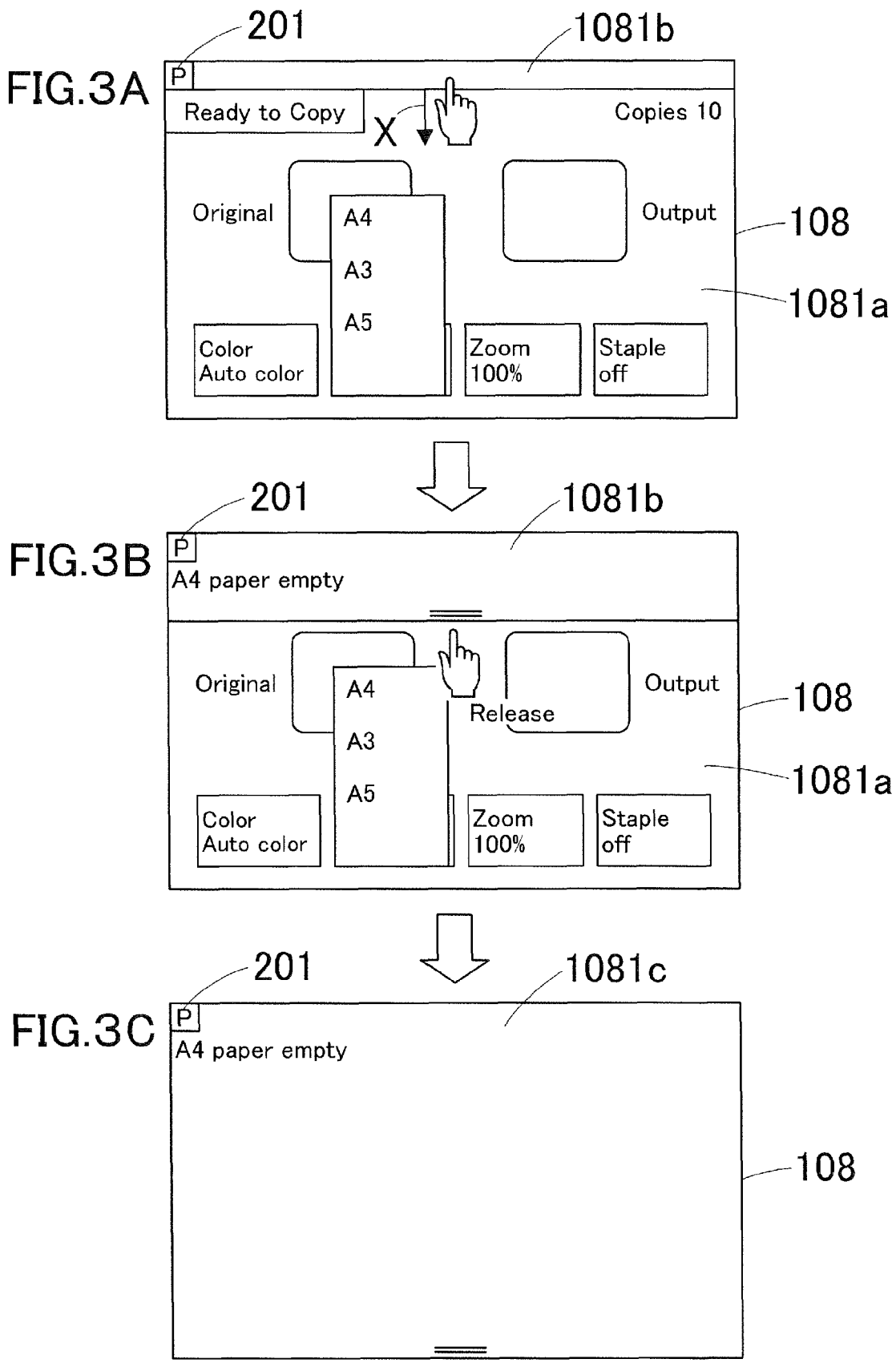

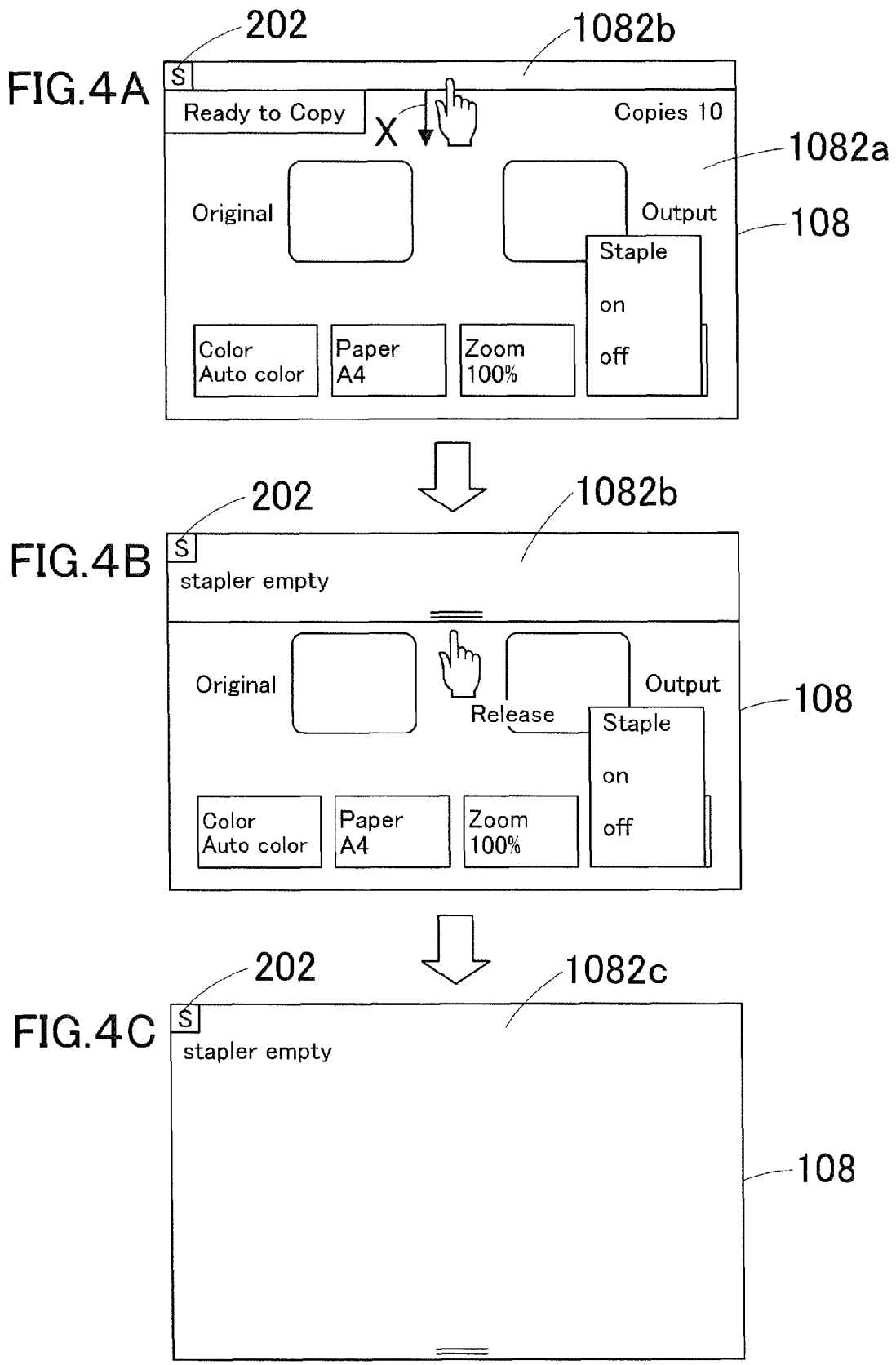

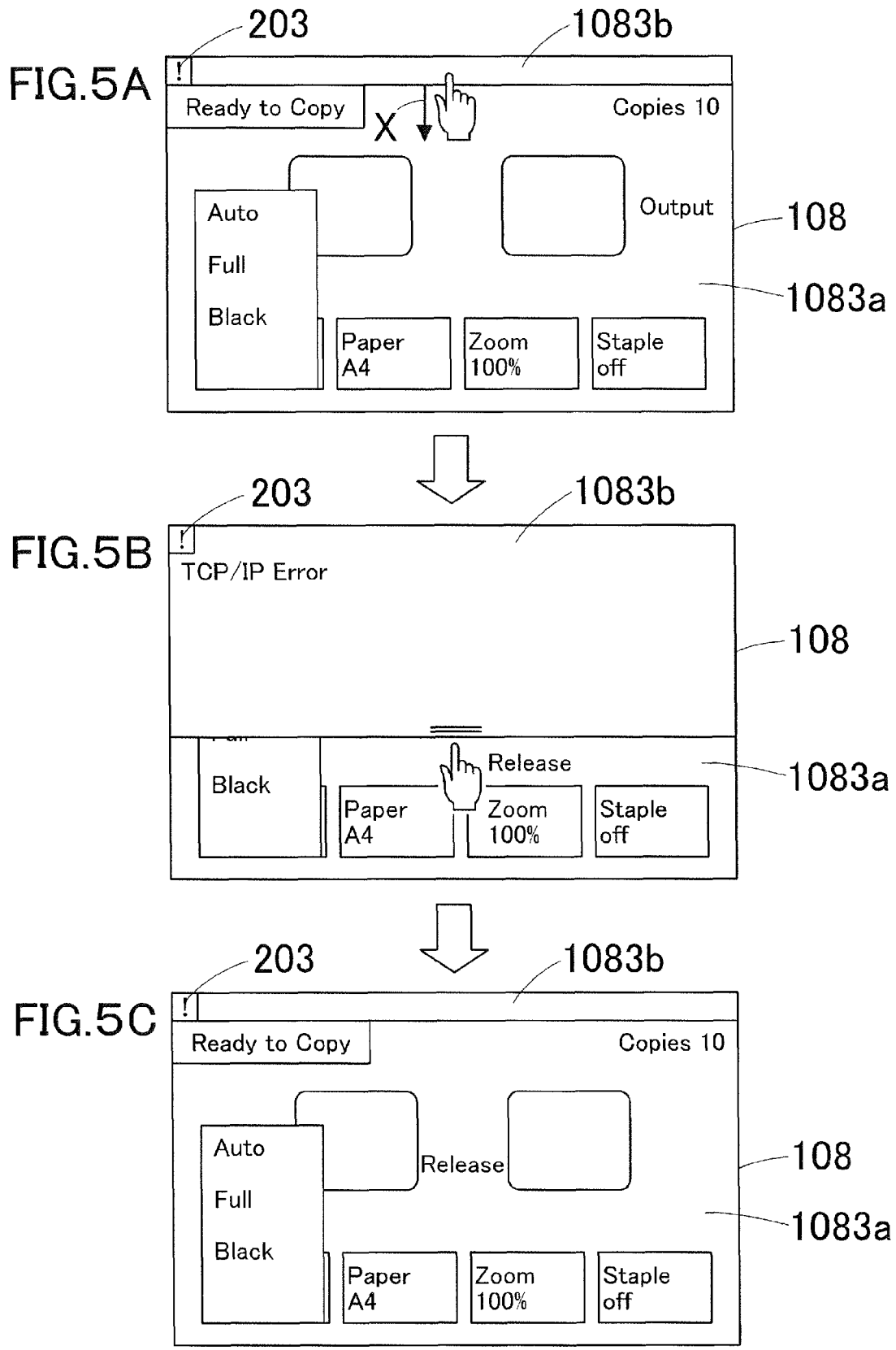

| Copy Operation | | FAX SCAN Operation | | USB BOX Operation | |
|---|---|---|---|---|---|
| Expand the status view area | Restore the status view area | Expand the status view area | Restore the status view area | Expand the status view area | Restore the status view area |
| •Toner near empty<br>•Waste toner box near full<br>•Paper near empty<br>•PRT error warning<br>•IR error warning | •Unable to login the mail server<br>•Connection timeout<br>•Unable to decode the message because of incorrect MIME or S/MIME format<br>•Insufficient memory space for incoming messages<br>•Unable to delete the message | (1)E-Mail/IFAX<br>•Unable to login the mail server<br>•Internal error<br>•Unable to access the server<br>•Connection timeout<br>•Unable to decode the message because of incorrect MIME or S/MIME format<br><br>(2)Scan to FTP<br>•No protocol is enabled<br>•Connection is shut down<br>•Network processing is busy<br>•Wrong login name and/or password<br>•The specified folder could not be found<br><br>(3)G3Fax<br>•Transmission error<br>•Receipt error<br>•MIF driver error<br>•Main I/F error<br>•File system error | •Toner near empty<br>•Waste toner box near full<br>•Paper near empty<br>•PRT error warning<br>•IR error warning | Unable to access the USB device | BOX print job<br>•Unable to login the mail server<br>•Internal error<br>•Unable to access the server<br>•Connection timeout<br>•Unable to decode the message because of incorrect MIME or S/MIME format<br>•Insufficient memory space for incoming messages |

FIG.6

IMAGE PROCESSING APPARATUS, SCREEN DISPLAY CONTROL METHOD, AND RECORDING MEDIUM

This application claims priority under 35 U.S.C. §119 to Japanese Patent Application No. 2014-018016 filed on Jan. 31, 2014, the entire disclosure of which is incorporated herein by reference in its entirety.

BACKGROUND OF THE INVENTION

1. Field of the Invention

The present invention relates to: an image processing apparatus such as a multi-function peripheral (MFP), i.e., a multifunctional digital image forming apparatus; a screen display control method to be implemented by the image processing apparatus; and a non-transitory computer-readable recording medium storing a screen display control program for the image processing apparatus to implement the screen display control method.

2. Description of the Related Art

The following description sets forth the inventor's knowledge of related art and problems therein and should not be construed as an admission of knowledge in the prior art.

There has been a well-known image processing apparatus that displays an operation screen on a display of an operation panel with a belt-like status view area shown in the upper region of the operation screen, for example. By sliding the status view area into the operation screen, users can expand the status view area in full-screen to see detailed information about the status of the image processing apparatus.

The users may finish the sliding manipulation after the finger passes over the center of the height of the operation screen; in such a case, the status view area can be expanded in full-screen by automatic sliding. The users may finish the sliding manipulation before the finger reaches the center of the height of the operation screen; in such a case, the status view area can be restored to the previous state before the sliding manipulation.

Such a configuration has a problem to be described later.

Meanwhile, Japanese Unexamined Patent Publication No. 2012-103602 suggests an image processing apparatus having a user interface that contributes to the convenience by facilitating sliding an operation screen into another screen. Specifically, the image processing apparatus is provided with: a screen display processor that displays a first screen on an operation panel; a sliding display processor that slides a second screen into the first screen along a sliding path in response to a user operating the operation panel, the sliding path extending from one end to another end of a display surface, the second screen having a plurality of operation keys residing at different positions on the sliding path; a sliding controller that stops the second screen in motion in an event of a status change, the status change being identified as a predetermined condition; and an input processor that accepts inputs from at least one of the operation keys, the at least one operation keys being displayed on the second screen. As soon as the second screen is even partially moved into the first screen on the sliding path, the image processing apparatus stops the second screen in motion and enables the operation keys on the second screen, the second screen being left on the sliding path.

With this image processing apparatus, the status view area may provide immediately needed information relevant to the presently displayed base screen when it is expanded in full-screen and users may accidentally release the finger from the display before the finger reaches the center of the height of the operation screen. In such a case, the status view area is restored to the previous state before the sliding manipulation, which results in the users failing to obtain the immediately needed information and bothering to perform a sliding manipulation again. This is an unsolved problem.

More specifically, a user finds a toner empty sign on the status view area when setting the color mode to full-color via a color mode setting screen, for example. The user slides the status view area into the operation screen for the details and releases the finger from the display accidentally before the finger reaches the center of the height of the operation screen. The status view area is then restored to the previous state without the user's intent; thus the user needs to perform a sliding manipulation for the details again.

In another case, the status view area may provide less needed information irrelevant to the presently displayed base screen when it is expanded in full-screen on the display and users may accidentally release the finger from the display after the finger passes over the center of the height of the operation screen. In such a case, the status view area is expanded in full-screen, which results in the users bothering to see the details for nothing and address the situation. This also is an unsolved problem.

More specifically, a user finds a network error sign on the status view area when setting the color mode to full-color via a color mode setting screen, for example. The user slides the status view area into the operation screen for the details but releases the finger from the display accidentally after the finger passes over the center of the height of the operation screen, noticing irrelevant information on the status view area. The status view area is then expanded in full-screen without the user's intent.

Thus the user needs to perform an extra manipulation for restoring the expanded status view area to the previous state.

Japanese Unexamined Patent Publication No. 2012-103602 teaches reducing the hand travel distance by stopping the status view area in motion, i.e., a technique for facilitating user manipulations, which apparently is not a solution to the above-described problems.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

A first aspect of the present invention relates to an image processing apparatus including:
- a touch-enabled display that is capable of displaying a first screen and a second screen smaller than the first screen, the second screen showing information, the second screen to be expanded with a user manipulation of sliding the second screen on the display;
- a memory that stores reference information determining which information on the second screen is relevant and irrelevant to the first screen;
- a judgment portion that judges whether or not the information shown on the second screen is relevant to the first screen on the basis of the reference information stored on the memory, the first screen and the second screen both being displayed on the display; and
- a display controller that expands the second screen even without the sliding manipulation being completely finished if the judgment portion judges that the information shown on the second screen is relevant to the first screen and that restores the second screen to the previous state before the sliding manipulation upon finish of the sliding manipulation if the judgment portion judges that the information shown on the second screen is irrelevant to the first screen.

A second aspect of the present invention relates to a screen display control method to be implemented by an image processing apparatus, the image processing apparatus including:

a touch-enabled display that is capable of displaying a first screen and a second screen smaller than the first screen, the second screen showing information, the second screen to be expanded with a user manipulation of sliding the second screen on the display; and a memory that stores reference information determining which information shown on the second screen is relevant and irrelevant to the first screen, the screen display control method including:

judging whether or not the information shown on the second screen is relevant to the first screen on the basis of the reference information stored on the memory, the first screen and the second screen both being displayed on the display; and expanding the second screen even without the sliding manipulation being completely finished if it is judged that the information shown on the second screen is relevant to the first screen and restoring the second screen to the previous state before the sliding manipulation upon finish of the sliding manipulation if it is judged that the information shown on the second screen is irrelevant to the first screen.

A third aspect of the present invention relates to a non-transitory computer-readable recording medium storing a screen display control program to be executed by a computer of an image processing apparatus, the image processing apparatus including:

a touch-enabled display that is capable of displaying a first screen and a second screen smaller than the first screen, the second screen showing information, the second screen to be expanded with a user manipulation of sliding the second screen on the display; and a memory that stores reference information determining which information shown on the second screen is relevant and irrelevant to the first screen, the screen display control program including:

judging whether or not the information shown on the second screen is relevant to the first screen on the basis of the reference information stored on the memory, the first screen and the second screen both being displayed on the display; and expanding the second screen even without the sliding manipulation being completely finished if it is judged that the information shown on the second screen is relevant to the first screen and restoring the second screen to the previous state before the sliding manipulation upon finish of the sliding manipulation if it is judged that the information shown on the second screen is irrelevant to the first screen.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which:

FIGS. 3A-C illustrate another example of a series of screens to be shown when a user slides a second screen into a first screen;

FIGS. 4A-C illustrate yet another example of a series of screens to be shown when a user slides a second screen into a first screen;

FIGS. 5A-C illustrate still yet another example of a series of screens to be shown when a user slides a second screen into a first screen;

FIG. 6 is a table containing reference information that determines whether or not there is relevance between the first screen and the second screen.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Hereinafter, some embodiments of the present invention will be described with reference to the accompanying figures.

Figure 1:
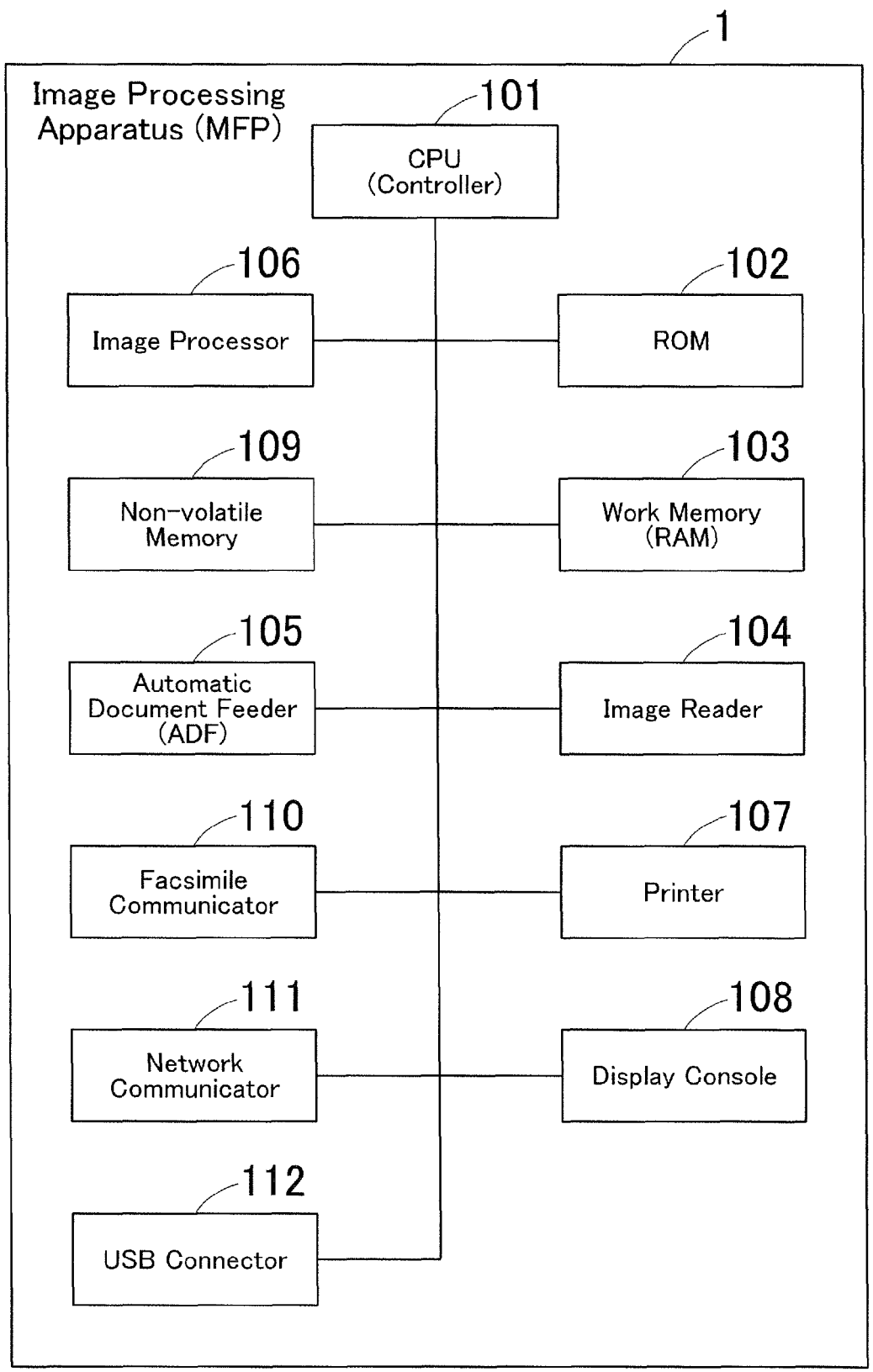
FIG. 1 is a block diagram illustrating a basic configuration of an image processing apparatus according to one embodiment of the present invention.

FIG. 1 is a block diagram illustrating a basic configuration of an image processing apparatus 1 according to one embodiment of the present invention. In this embodiment, a MFP having various functions such as a copier function, a printer function, and a scanner function, as described above, is employed as the image processing apparatus 1.

The image processing apparatus 1 is provided with: a CPU (controller) 101; a ROM 102; a work memory 103; an image reader 104; an automatic document feeder (ADF) 105; an image processor 106; a printer 107; a display console 108; a non-volatile memory 109; a facsimile communicator 110; a network communicator 111; a USB connector 112; and others.

The CPU 101 controls the entire image processing apparatus 1 in a unified and systematic manner, allowing users to use basic functions of the image processing apparatus 1 such as a copier function, a printer function, a scanner function, and a facsimile function. Specifically, in this embodiment, the CPU 101 judges whether or not information on a status view area (a second screen) is relevant to a base operation screen (a first screen) displayed on the display console 108, on the basis of reference information and performs a control operation when a user slides the status view area into the base screen, which will be later described in detail.

The RAM 102 is a memory that stores operation programs to be executed by the CPU 101 and other data. The work memory 103 is a memory that provides a work area for the CPU 101 to perform processing in accordance with an operation program stored on the ROM 102.

The image reader 104 converts physical images into digital by scanning a document put on a platen (not shown in this figure) or sheets of a document sequentially conveyed by the automatic document feeder 105 that is also known as ADF.

The image processor 106 performs a predetermined image processing operation on image data obtained by the image reader 104 and other data. The printer 107 prints the image data obtained by the image reader 104, print data received from user terminals, and other data, in a specified print mode.

The display console 108 is comprised of a liquid-crystal display having a touch-panel function; the display console 108 displays an operation screen and also displays a message for users and the status of the image processing apparatus 1 on the screen. The touch-panel function allows users to perform touch manipulations. The touch-panel function also allows them to perform gesture manipulations such as sliding manipulations.

The non-volatile memory 109 is comprised of a non-volatile memory device such as a hard disk drive (HDD). The non-volatile memory 109 stores image data obtained by the image reader 104, data received from other image processing apparatuses and user terminals, various applications, and others.

The facsimile communicator 110 controls a facsimile performing data transmission and receipt and the network communicator 111 performs data transmission and receipt by controlling communication with external apparatuses on the network such as other image processing apparatuses and user terminals.

The USB connector 112 serves to connect a USB device to the image processing apparatus 1; via the USB connector 112, a portable recording medium such as a USB memory can be connected to the image processing apparatus 1.

When a user accesses a function of the image processing apparatus 1, such as a copier or facsimile function, the image processing apparatus 1 displays an operation screen for the function on the display console 108.

Figure 2A:
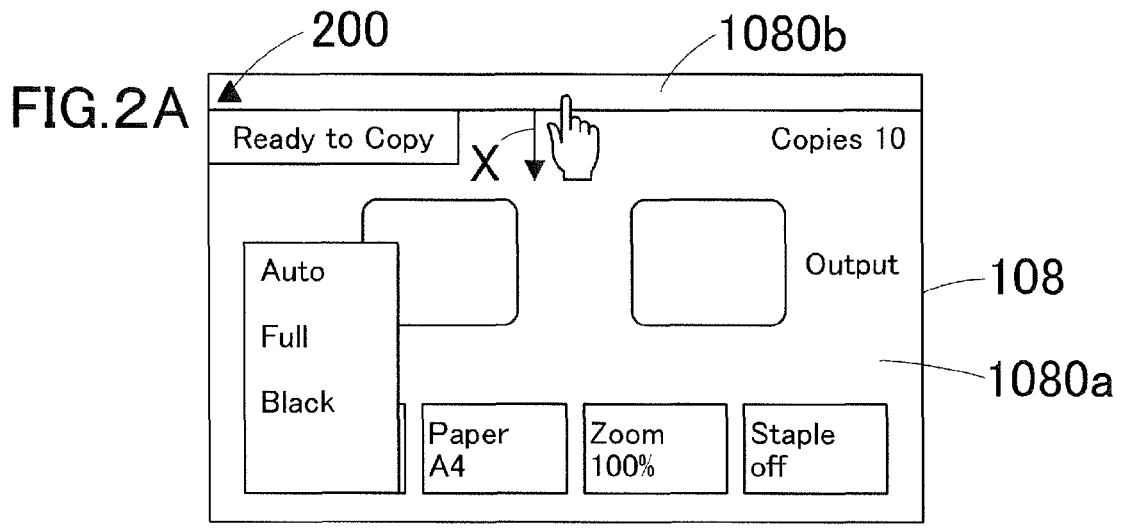
FIGS. 2A-C illustrate an example of a series of screens to be shown when a user slides a second screen into a first screen.

For example, as illustrated in FIG. 2A, when a user accesses a copier function, an operation screen 1080*a* for copy job settings is displayed as a first screen on the display console 108 along with a belt-like, horizontally long and narrow status view area 1080*b* being shown as a second screen in the upper region of the screen. When there is a status change to the image processing apparatus 1, i.e., in an event of a trouble such as toner empty or internal error, an icon denoting the trouble appears in the status view area 1080*b*.

Figure 2B:
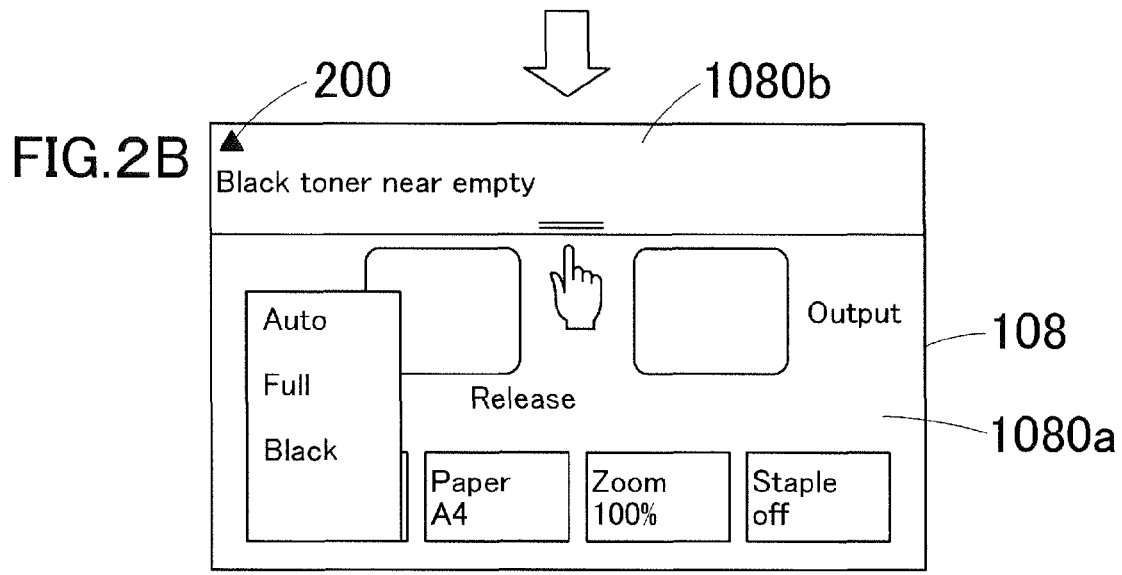
Figure 2C:
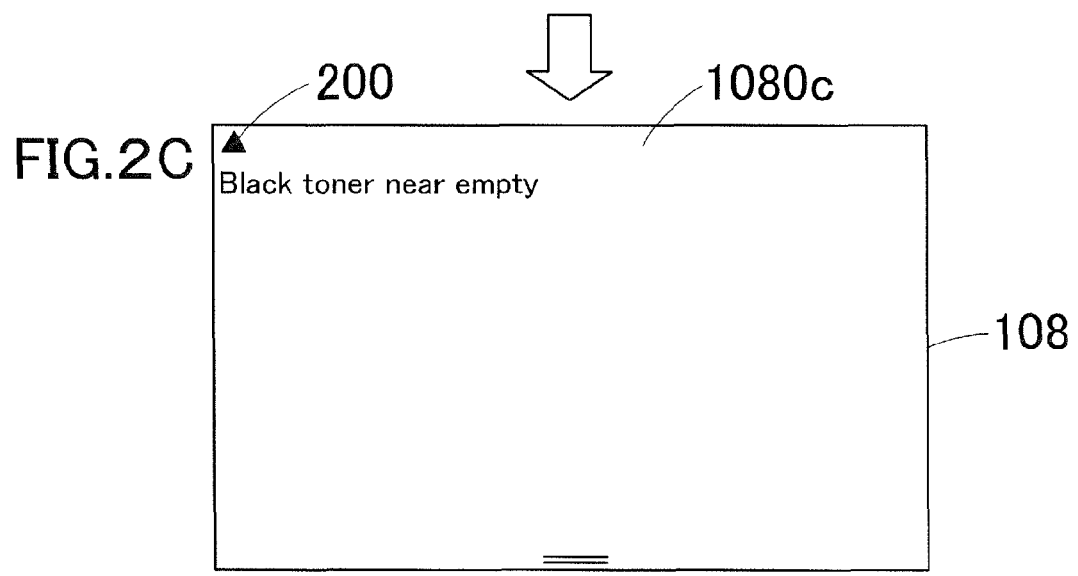

The user then touches the status view area 1080*b* and slides it down to the direction X with the finger as illustrated in FIG. 2A; with the motion of the finger, the status view area is gradually expanded downward as illustrated in FIG. 2B. When the finger passes over the center of the height of the operation screen, a detailed information screen 1080*c*, which corresponds to the status view area 1080*b* in full-screen, is displayed as illustrated in FIG. 2C.

Here, it should be noted that the status view area 1080*b* does not always provide relevant information to the presently displayed operation screen. Thus users may expand the status view area 1080*b* in full-screen as illustrated in FIG. 2C only to see irrelevant information to the presently displayed operation screen, which results in the users bothering to perform an extra operation for restoring the status view area 1080*b* to the previous state.

Users also may fail to expand the status view area 1080*b* in full-screen because finishing the sliding manipulation (releasing the finger) before the finger travels a long enough distance, which results in the users bothering to perform a sliding manipulation again.

As a solution to the problem, in this embodiment, if information on the status view area 1080*b* is relevant to the operation screen 1080*a*, it is expanded in full-screen even before the finger travels a long enough distance, and if information on the status view area 1080*b* is irrelevant to the operation screen 1080*a*, it is restored to the previous state even after the finger travels a long enough distance.

For example, as illustrated in FIG. 2A, when a user accesses a copier function, the operation screen 1080*a* for color mode settings is displayed with the status view area 1080*b* shown in the operation screen; and the user finds a warning icon 200 denoting toner empty in the status view area 1080*b*.

The user slides the status view area 1080*b* into the operation screen for the warning details and finishes the sliding manipulation before the finger reaches the center of the height of the operation screen as illustrated in FIG. 2B.

Presently, the operation screen 1080*a* is a screen for color mode settings of the copier function and the status view area 1080*b* provides toner information; the information on the status view area 1080*b* is apparently relevant to the operation screen 1080*a*. Consequently, even before the finger travels a long enough distance, the detailed information screen 1080*c*, which corresponds to the status view area 1080*b* in full-screen, is displayed as illustrated in FIG. 2C. Similarly, as a matter of course, after the finger travels a long enough distance, the detailed information screen 1080*c*, which corresponds to the status view area 1080*b* in full-screen, is displayed.

For another example, as illustrated in FIG. 3A, when a user accesses a copier function, an operation screen 1081*a* for color mode settings is displayed with a status view area 1081*b* shown in the operation screen; and the user finds a warning icon 201 denoting paper empty in the status view area 1081*b*.

The user slides the status view area 1081*b* into the operation screen for the warning details and finishes the sliding manipulation before the finger reaches the center of the height of the operation screen as illustrated in FIG. 3B.

Presently, the operation screen 1081*a* is a screen for color mode settings of the copier function and the status view area 1081*b* provides paper information; the information on the status view area 1081*b* is apparently relevant to the operation screen 1081*a*. Consequently, even before the finger travels a long enough distance, a detailed information screen 1081*c*, which corresponds to the status view area 1081*b* in full-screen, is displayed as illustrated in FIG. 3C.

Yet for another example, as illustrated in FIG. 4A, when a user accesses a copier function, an operation screen 1082*a* for staple mode settings is displayed with a status view area 1082*b* shown in the operation screen; and the user finds a warning icon 202 denoting staple empty in the status view area 1082*b*.

The user slides the status view area 1082*b* into the operation screen for the warning details and finishes the sliding manipulation before the finger reaches the center of the height of the operation screen as illustrated in FIG. 4B.

Presently, the operation screen 1082*a* is a screen for staple mode settings of the copier function and the status view area 1082*b* provides staple information; the information on the status view area 1082*b* is apparently relevant to the operation screen 1082*b*. Consequently, even before the finger travels a long enough distance, a detailed information screen 1082*c*, which corresponds to the status view area 1082*b* in full-screen, is displayed as illustrated in FIG. 3C.

As described above, if information on the status view area is relevant to the presently displayed operation screen, it is expanded in full-screen even before the finger travels a long enough distance as it is after the finger travels a long enough distance, which contributes to the convenience of the user.

Still yet for another example, as illustrated in FIG. 5A, when a user accesses a copier function, an operation screen 1083a for color mode settings is displayed with a status view area 1083b shown in the operation screen; and the user finds a warning icon 201 denoting network error in the status view area 1083b.

The user slides the status view area 1083b into the operation screen for the warning details and finishes the sliding manipulation after the finger passes over the center of the height of the operation screen as illustrated in FIG. 5B.

Presently, the operation screen 1083a is a screen for color mode settings of the copier function and the status view area 1083b provides network information; the information on the status view area 1083b is apparently irrelevant to the operation screen 1083a. Consequently, even after the finger travels a long enough distance, the status view area 1083b is restored to the previous state before the sliding manipulation as illustrated in FIG. 5C: a detailed information screen is not displayed.

That is, user-friendliness is significantly improved since the user does not have to bother anymore to see the details for nothing or to perform an extra manipulation for restoring the status view area to the previous state.

Users having a specific authority such as an administrator authority for the image processing apparatus 1 are allowed to set in advance rules determining which information on the status view area is relevant and irrelevant to the operation screen and the rules are stored on a recording medium such as the non-volatile memory 109, as reference information.

On the basis of the reference information, the CPU judges whether or not information on the status view area is relevant to the operation screen.

FIG. 6 shows a detailed example of reference information determining whether or not there is relevance as described in the examples of FIGS. 2 to 5. According to the configuration of FIG. 6, an operation screen for a copier function is relevant to events of toner near empty, waste toner box near full, paper near empty, printer (PRT) error warning, image reader (IR) error warning, and other events; thus the status view area is automatically slid into such an operation screen when it displays the relevant information. Such an operation screen is irrelevant to events of mail server login error and timeout warning and other events; thus the status view area is automatically slid out of the operation screen (restored to the previous state) when it displays the irrelevant information.

According to the configuration, an operation screen for a facsimile function and network scan function for transmitting image data obtained by the imager reader 104 to a predetermined address through a fax line and network ("FAX SCAN operation" in FIG. 6) is relevant to events of facsimile and network error and other events (in such a case, the status view area is automatically slid into the operation screen). Such an operation screen is irrelevant to events nothing about facsimile or network scan function (in such a case, the status view area is automatically slid out of the operation screen).

According to the configuration, an operation screen for a storage and printer function for storing and printing image data obtained by the image reader 104 onto and from a USB memory connected to the USB connector 112 ("USB BOX operation" in FIG. 6) is relevant to an event of USB memory connection error (in such a case, the status view area is automatically slid into the operation screen). Such an operation screen is irrelevant to events nothing about the storage or printer function (in such a case, the status view area is automatically slid out of the operation screen).

Figure 7:
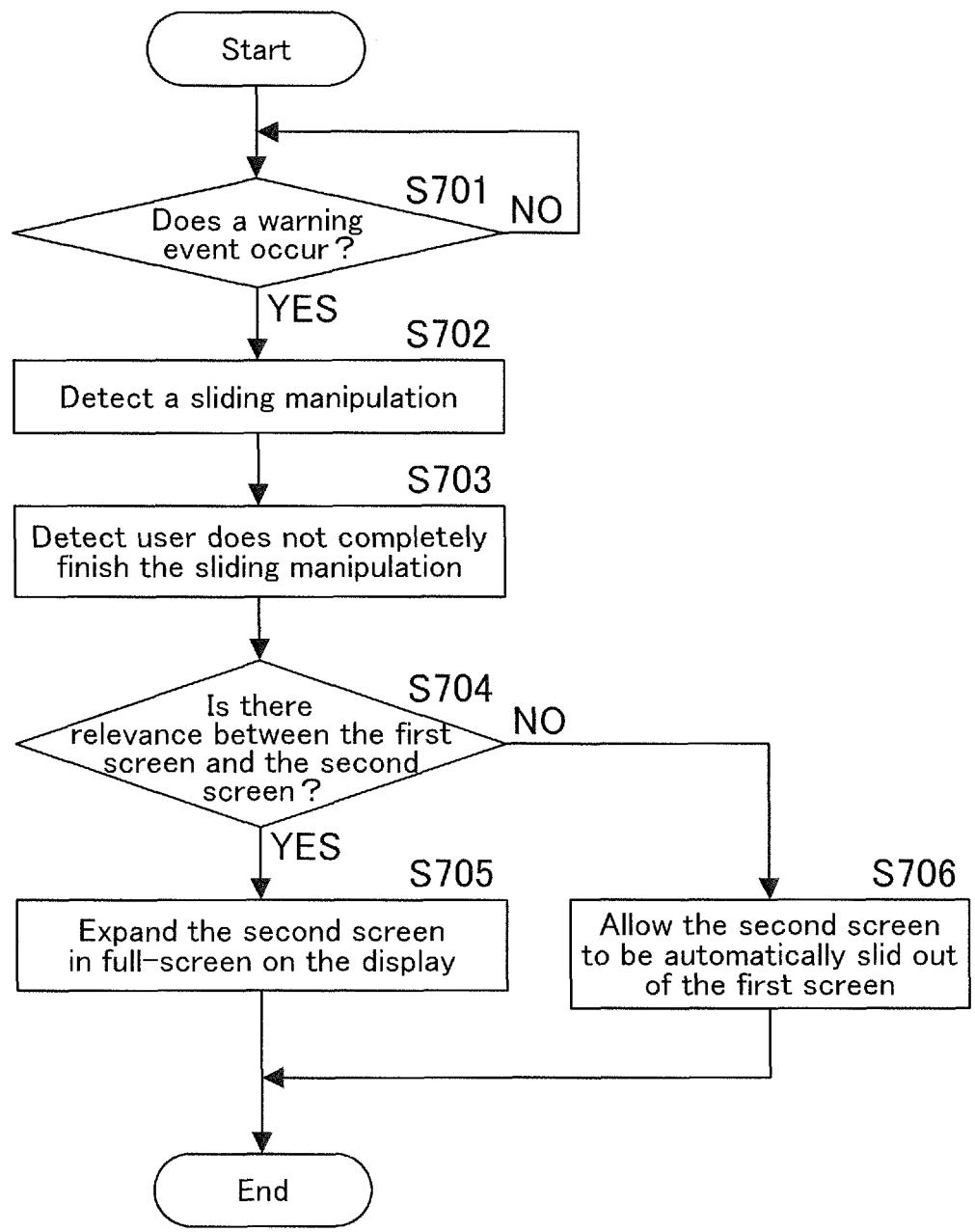
FIG. 7 is a flowchart representing an operation of the information processing apparatus.

FIG. 7 is a flowchart representing an operation of the image processing apparatus 1 when a user slides the status view area into the operation screen. The flowchart is executed by the CPU 101 in accordance with an operation program stored on a recording medium such as the ROM 102.

In Step S701, it is judged whether or not a warning event occurs. If a warning event does not occur (No in Step S701), the routine continues waiting until a warning event occurs. If a warning event occurs (YES in Step S701), the routine proceeds to Step S702. Upon detection of a warning event, a warning icon appears on the status view area.

In Step S702, it is detected that a user slides the status view area into the operation screen; in Step S703, it is further detected that the user does not completely finish the sliding manipulation by releasing the finger from the display.

Subsequently, in Step S704, it is judged whether or not information on the status view area (the second screen) is relevant to the operation screen (the first screen) on the basis of reference information whose example is shown in FIG. 6. If it is relevant to the first screen (YES in Step S704), the second screen is expanded in full-screen by automatic sliding in Step S705. If it is irrelevant to the first screen (NO in Step S704), the second screen is restored to the previous state by automatic sliding in Step S706.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. An image processing apparatus comprising:
a touch-enabled display that is capable of displaying a first screen and a second screen smaller than the first screen, the second screen showing information, the second screen to be expanded with a user manipulation of sliding the second screen on the display;
a memory that stores reference information determining which information on the second screen is relevant and irrelevant to the first screen;
a judgment portion that judges whether or not the information shown on the second screen is relevant to the first screen on the basis of the reference information stored on the memory, the first screen and the second screen both being displayed on the display; and
a display controller that expands the second screen even without the sliding manipulation being completely finished if the judgment portion judges that the information shown on the second screen is relevant to the first screen and that restores the second screen to a previous state before the sliding manipulation upon finish of the sliding manipulation if the judgment portion judges that the information shown on the second screen is irrelevant to the first screen.

2. The image processing apparatus as recited in claim 1, having a copier function, wherein the judgment portion judges that the information shown on the second screen is relevant to the first screen when the second screen shows information of toner while the first screen allows settings for the copier function and that the information shown on the second screen is irrelevant to the first screen when the second screen does not show information of toner while the first screen allows settings for the copier function.

3. The image processing apparatus as recited in claim 1, having a network scan function, the network scan function for transmitting image data obtained by document scanning to a specified address through a network, wherein the judgment portion judges that the information shown on the second screen is relevant to the first screen when the second screen shows information of network error while the first screen allows settings for the network scan function and that the information shown on the second screen is irrelevant to the first screen when the second screen does not show information related to the network scan function while the first screen allows settings for the network scan function.

4. The image processing apparatus as recited in claim 1, having a facsimile function, wherein the judgment portion judges that the information shown on the second screen is relevant to the first screen when the second screen shows information of facsimile communication error while the first screen allows settings for the facsimile function and that the information shown on the second screen is irrelevant to the first screen when the second screen does not show information related to the facsimile function while the first screen allows settings for the facsimile function.

5. The image processing apparatus as recited in claim 1, further comprising a connector that connects the image processing apparatus to a portable recording medium, the image processing apparatus having either or both of: a storage function for storing image data obtained by document scanning on the portable recording medium; and a printer function for printing data from the portable recording medium, wherein the judgment portion judges that the information shown on the second screen is relevant to the first screen when the second screen shows information of connection error to the portable recording medium while the first screen allows settings for the storage or printer function and that the information shown on the second screen is irrelevant to the first screen when the second screen does not show information related to the storage or printer function while the first screen allows settings for the storage or printer function.

6. A screen display control method to be implemented by an image processing apparatus, the image processing apparatus comprising:
a touch-enabled display that is capable of displaying a first screen and a second screen smaller than the first screen, the second screen showing information, the second screen to be expanded with a user manipulation of sliding the second screen on the display; and
a memory that stores reference information determining which information shown on the second screen is relevant and irrelevant to the first screen, the screen display control method comprising:
judging whether or not the information shown on the second screen is relevant to the first screen on the basis of the reference information stored on the memory, the first screen and the second screen both being displayed on the display; and
expanding the second screen even without the sliding manipulation being completely finished if it is judged that the information shown on the second screen is relevant to the first screen and restoring the second screen to a previous state before the sliding manipulation upon finish of the sliding manipulation if it is judged that the information shown on the second screen is irrelevant to the first screen.

7. The screen display control method as recited in claim 6, wherein the image processing apparatus has a copier function, the screen display control method further comprising the step of judging that the information shown on the second screen is relevant to the first screen when the second screen shows information of toner while the first screen allows settings for the copier function and that the information shown on the second screen is irrelevant to the first screen when the second screen does not show information of toner while the first screen allows settings for the copier function.

8. The screen display control method as recited in claim 6, wherein the image processing apparatus has a network scan function, the network scan function for transmitting image data obtained by document scanning to a specified address through a network, the screen display control method further comprising the step of judging that the information shown on the second screen is relevant to the first screen when the second screen shows information of network error while the first screen allows settings for the network scan function and that the information shown on the second screen is irrelevant to the first screen when the second screen does not show information related to the network scan function while the first screen allows settings for the network scan function.

9. The screen display control method as recited in claim 6, wherein the image processing apparatus has a facsimile function, the screen display control method further comprising the step of judging that the information shown on the second screen is relevant to the first screen when the second screen shows information of facsimile communication error while the first screen allows settings for the facsimile function and that the information shown on the second screen is irrelevant to the first screen when the second screen does not show information related to the facsimile function while the first screen allows settings for the facsimile function.

10. The screen display control method as recited in claim 6, wherein the image processing apparatus further comprises a connector that connects the image processing apparatus to a portable recording medium, the image processing apparatus having either or both of: a storage function for storing image data obtained by document scanning on the portable recording medium; and a printer function for printing data from the portable recording medium, the screen display control method further comprising the step of judging that the information shown on the second screen is relevant to the first screen when the second screen shows information of connection error to the portable recording medium while the first screen allows settings for the storage or printer function and that the information shown on the second screen is irrelevant to the first screen when the second screen does not show information related to the storage or printer function while the first screen allows settings for the storage or printer function.

11. A non-transitory computer-readable recording medium storing a screen display control program to be executed by a computer of an image processing apparatus, the image processing apparatus comprising:
a touch-enabled display that is capable of displaying a first screen and a second screen smaller than the first screen, the second screen showing information, the second screen to be expanded with a user manipulation of sliding the second screen on the display; and
a memory that stores reference information determining which information shown on the second screen is relevant and irrelevant to the first screen, the screen display control program comprising:
judging whether or not the information shown on the second screen is relevant to the first screen on the basis of the reference information stored on the memory, the first screen and the second screen both being displayed on the display; and
expanding the second screen even without the sliding manipulation being completely finished if it is judged that the information shown on the second screen is relevant to the first screen and restoring the second screen to a previous state before the sliding manipulation upon finish of the sliding manipulation if it is judged that the information shown on the second screen is irrelevant to the first screen.

12. The non-transitory computer-readable recording medium storing the screen display control program to be executed by the computer of the image processing apparatus as recited in claim 11, the image processing apparatus having a copier function, wherein, in accordance with the screen display control program, the computer judges that the information shown on the second screen is relevant to the first screen when the second screen shows information of toner while the first screen allows settings for the copier function and that the information shown on the second screen is irrelevant to the first screen when the second screen does not show information of toner while the first screen allows settings for the copier function.

13. The non-transitory computer-readable recording medium storing the screen display control program to be executed by the computer of the image processing apparatus as recited in claim 11, the image processing apparatus having a network scan function, the network scan function for transmitting image data obtained by document scanning to a specified address through a network, wherein, in accordance with the screen display control program, the computer judges that the information shown on the second screen is relevant to the first screen when the second screen shows information of network error while the first screen allows settings for the network scan function and that the information shown on the second screen is irrelevant to the first screen when the second screen does not show information related to the network scan function while the first screen allows settings for the network scan function.

14. The non-transitory computer-readable recording medium storing the screen display control program to be executed by the computer of the image processing apparatus as recited in claim 11, the image processing apparatus having a facsimile function, wherein, in accordance with the screen display control program, the computer judges that the information shown on the second screen is relevant to the first screen when the second screen shows information of facsimile communication error while the first screen allows settings for the facsimile function and that the information shown on the second screen is irrelevant to the first screen when the second screen does not show information related to the facsimile function while the first screen allows settings for the facsimile function.

15. The non-transitory computer-readable recording medium storing the screen display control program to be executed by the computer of the image processing apparatus as recited in claim 11, the image processing apparatus further comprising a connector that connects the image processing apparatus to a portable recording medium, the image processing apparatus having either or both of: a storage function for storing image data obtained by document scanning on the portable recording medium; and a printer function for printing data from the portable recording medium, wherein, in accordance with the screen display control program, the computer judges that the information shown on the second screen is relevant to the first screen when the second screen shows information of connection error to the portable recording medium while the first screen allows settings for the storage or printer function and that the information shown on the second screen is irrelevant to the first screen when the second screen does not show information of the storage or printer function while the first screen allows settings for the storage or printer function.

* * * * *